United States Patent
Torrado et al.

(10) Patent No.: US 10,900,328 B2
(45) Date of Patent: Jan. 26, 2021

(54) COMPUTER IMPLEMENTED METHOD FOR GENERATING A FIELD DEVELOPMENT PLAN (FDP) FOR THE EXPLOITATION OF OIL AND GAS RESERVOIRS

(71) Applicants: REPSOL, S. A., Madrid (ES); International Business Machines Corporation, Armonk, NY (US)

(72) Inventors: Ruben Rodriguez Torrado, Madrid (ES); Jesus Rios Aliaga, White Plains, NY (US); Giorgio De Paola, Madrid (ES); Sonia Mariette Embid Droz, Madrid (ES)

(73) Assignees: International Business Machines Corporation, Armonk, NY (US); REPOSOL, S.A.

( * ) Notice: Subject to any disclaimer, the term of this patent is extended or adjusted under 35 U.S.C. 154(b) by 915 days.

(21) Appl. No.: 15/397,056

(22) Filed: Jan. 3, 2017

(65) Prior Publication Data
US 2017/0335662 A1   Nov. 23, 2017

(30) Foreign Application Priority Data
May 19, 2016 (EP) .................................. 16382221

(51) Int. Cl.
*E21B 41/00* (2006.01)
*G06Q 10/04* (2012.01)
(Continued)

(52) U.S. Cl.
CPC .......... *E21B 41/0092* (2013.01); *G06F 17/18* (2013.01); *G06F 30/20* (2020.01);
(Continued)

(58) Field of Classification Search
CPC ................................................... E21B 41/0092
(Continued)

(56) References Cited

U.S. PATENT DOCUMENTS 10,366,185 B2 * 7/2019 Lin ..................... G06F 17/5018
2007/0014435 A1 * 1/2007 Mirowski .............. G01V 11/00
                                              382/109
(Continued)

FOREIGN PATENT DOCUMENTS

BR        0910333 A2   10/2015
CN       102016746 A    4/2011
(Continued)

OTHER PUBLICATIONS

"European Search Report", Reference P13383EP00, Application No. 16382221.6-1955, dated Oct. 24, 2016, 7 pages.

*Primary Examiner* — Hien D Khuu
(74) *Attorney, Agent, or Firm* — Stephen R. Yoder (57) ABSTRACT

A system, method and program product for generating an optimal field development plan (FDP) for the exploitation of oil and gas reservoirs when the available data of the reservoir is limited. A tree is generated starting from a root node wherein each node represents a decision or an observation of the field. The tree generation includes a specific manner of combining a search and a rollout process for exploring paths providing candidates of field development plans (FDP) and adding new nodes to the tree. The method reduces drastically the computational cost providing an affordable manner of estimating an optimal field development plan (FDP) before carrying out the exploitation of the reservoir.

17 Claims, 5 Drawing Sheets

(51) Int. Cl.
*G06Q 50/06* (2012.01)
*G06F 30/20* (2020.01)
*G06F 17/18* (2006.01)
*G06F 111/10* (2020.01)
*E21B 49/00* (2006.01)

(52) U.S. Cl.
CPC ............ *G06Q 10/04* (2013.01); *G06Q 50/06* (2013.01); *E21B 49/003* (2013.01); *G06F 2111/10* (2020.01)

(58) Field of Classification Search
USPC .......................................................... 706/45
See application file for complete search history.

(56) References Cited

U.S. PATENT DOCUMENTS

| | | | |
|---|---|---|---|
| 2009/0164182 A1* | 6/2009 | Pedersen | G01V 11/00 703/2 |
| 2010/0332442 A1 | 12/2010 | Goel | |
| 2013/0346042 A1* | 12/2013 | Shen | G01V 3/083 703/2 |
| 2016/0146973 A1* | 5/2016 | Johnson | G01V 1/306 702/2 |

FOREIGN PATENT DOCUMENTS

| | | |
|---|---|---|
| CN | 109416769 A | 3/2019 |
| EP | 2291799 A2 | 3/2011 |
| EP | 3246858 A1 | 11/2017 |
| EP | 3459027 A1 | 3/2019 |
| WO | 2009131761 A2 | 10/2009 |
| WO | 2017198556 A1 | 11/2017 |

* cited by examiner

| $1_1$ | $1_2$ | $1_3$ | $1_4$ | $1_5$ |
|---|---|---|---|---|
| $1_6$ | $1_7$ | $1_8$ | $1_9$ | $1_{10}$ |
| $1_{11}$ | $1_{12}$ | $1_{13}$ | $1_{14}$ | $1_{15}$ |
| $1_{16}$ | $1_{17}$ | $1_{18}$ | $1_{19}$ | $1_{20}$ |
| $1_{21}$ | $1_{22}$ | $1_{23}$ | $1_{24}$ | $1_{25}$ |

$\delta\Omega_d$

COMPUTER IMPLEMENTED METHOD FOR GENERATING A FIELD DEVELOPMENT PLAN (FDP) FOR THE EXPLOITATION OF OIL AND GAS RESERVOIRS

CROSS REFERENCE TO RELATED APPLICATION

The present application claims priority under 35 USC § 119 to European Patent Application No. EP16382221.6, "COMPUTER IMPLEMENTED METHOD FOR GENERATING A FIELD DEVELOPMENT PLAN (FDP) FOR THE EXPLOITATION OF OIL AND GAS RESERVOIRS" to Rodriguez Torrado et al., filed May 19, 2016 with the European Patent Office, assigned to the assignees of the present invention and incorporated herein by reference.

BACKGROUND OF THE INVENTION

Field of the Invention

The present invention related to a computer implemented method for generating an optimal field development plan (FDP) for the exploitation of oil and gas reservoirs when the available data of the reservoir is limited.

Background Description

The life cycle of a reservoir has mainly of five phases: exploration, appraisal, development, production and abandonment. It is the development phase the most important one from a decision making viewpoint since the largest investments are associated with this phase. In addition, the great amounts of uncertainty about the subsurface of the reservoir make these investment decisions very challenging. In this context, the evaluation and selection of the best development plan is critical to guarantee the profitability of a reservoir.

The reservoir is typically modeled as a grid with petrophysical property values associated to each cell. The exact values for these properties are obviously unknown. Uncertainty around the reservoir's petrophysical properties is modeled probabilistically by estimating a geostatistical model to the exploration data. A field development plan (FDP) determines the production strategy, specifying, among other things, the location and drilling schedule of wells. Reservoir simulation models are used to forecast field production rates of any production strategy candidate for a given reservoir model. This allows the estimation of the economic value for each FDP option.

Field development planning (FDP) could be formulated as an optimization problem under uncertainty. Current optimization approaches to FDP do not take into consideration the sequential nature of the problem. In practice, drilling location decisions alternate with the observation of information acquired between drillings. For example, petrophysical properties at the location of each well become known after the well is drilled and this localized information is used to learn about these properties in the nearby area through the spatial correlation of the geostatistical model.

Consequently, there is a need for providing a field development plan (FDP) previous to the exploitation of the reservoir wherein the optimization process takes into account the observations after drilling; therefore reducing the uncertainty of the estimated resources obtained after the exploitation and providing a better strategy optimizing said production.

SUMMARY OF THE INVENTION

A feature of the invention is a proactively balanced workload, balanced across multiple processors;

Another feature of the invention is proactively balancing simulation workload across multiple processors simulating energy production in a hydrocarbon energy field;

Yet another feature of the invention is identification of future workload imbalances among parallel processors simulating energy production in a hydrocarbon energy field, and rebalancing workload prior to the occurrence of an imbalance to proactively balance simulation workload.

The present invention is a computer implemented method for generating a field development plan (FDP) for the exploitation of oil and gas reservoirs.

The computer implemented method may be executed in a computer system and embodied as a computer program product. The method comprises:

a) determining a discretized domain $\delta\Omega_d$ comprising a grid of a finite number of locations of the reservoir as the candidate locations for drilling a well;

b) providing a first module configured to generate a geo-statistical model realization of the reservoir according to:
  the facies and/or petrophysical properties obtained from green field data, analogous data or both and,
  a predetermined number p of facies and/or petrophysical properties $(PR_i)$, $i=1 \ldots p$ specified at determined locations of the discretized domain $\delta\Omega_d$, if any;

c) providing a second reservoir flow simulator module configured to simulate a geo-statistical model realization according to a field development plan (FDP) and configured to return an utility reward value;

The exploitation of the reservoir requires specifying the location of the wells. The wells are mainly located at the surface of the reservoir and the drill reaches the subsurface regions storing the oil or gas to be produced. The invention is not limited to a surface discretized domain $\delta\Omega_d$ as, for instance, the discretization may be defined under the surface of a predetermined domain that can be divided into cells. The discretization in cells allows determining locations of drills.

The computer implemented method combines two modules, a first module adapted to generate a geo-statistical model realizations and a second module adapted to simulate a geo-statistical model realizations according to a field development plan (FDP).

The first module provides a geo-statistical model realization that can be used for determining a probability function disclosing a realization of the reservoir or as one of the inputs of the second module allowing the simulation. The geo-statistical model realization is stochastically generated in such a way that the realization meets the values of the facies and/or petrophysical properties inputted into the first model. The facies and/or petrophysical properties passed to the first module are those available from green field data, analogous data or both. When the method progresses and some observations specify additional properties, the first module also imposes such additional properties at determined locations in the generation of the geo-statistical model realization.

Parameter p is a pre-specified value, the number of properties that will be explored. In the embodiments disclosed in the section of description of embodiments the parameter p is 2 indicating that only two facies will be explored. Other physical properties are for instance the hydraulic flow units.

d) determining a tree structure data, starting from a root node, wherein the nodes of the tree are structured by levels, alternating levels comprising nodes representing a decision ($a_t$) and levels comprising nodes representing an observation ($o_t$) wherein the sequence of decisions and observations from the root node to a certain node $X_t$ is identified by the history as $h_t=(a_1, o_1, a_2, o_2, a_t, o_t)$ and wherein:

taking a decision ($a_{t+1}$) comprises determining a drilling candidate location of the node among the locations of the discretized domain $\delta\Omega_d$ not being determined in another node of the tree;

taking an observation ($o_{t+1}$), being at the drilling candidate location of the previous decision node, comprises:
  i. generating a plurality of geo-statistical model realizations by means of the first module according to the ($PR_i$), i=1 . . . p facies and/or petrophysical properties determined by the previous observations of the history $h_t$,
  ii. determining the conditional probability $P(PR_i|h_t)$, i=1 . . . p from the plurality of geo-statistical models generated in the previous step i),
  iii. providing an stochastically sampled property according to the conditional probability $P(PR_i|h_t)$, as being the result of the observation ($o_{t+1}$)

and wherein the determination of the nodes of said tree structure data comprises the following steps:

departing from the root node, initializing as the expected utility reward value for each decision node of the first level a predetermined maximum value, do
  iv. sort the paths of the tree structure data departing from the root according to the expected utility reward value,
  v. the path with maximum expected utility reward value is explored from the at least last node, the farthest to the root node, by a rollout process, said rollout process comprising the steps:
    taking a decision for determining a drilling candidate location,
    taking an observation, until a complete field development plan (FDP) is reached,
  vi. evaluate a new expected utility reward value for the explored path by means of the second module by running the second reservoir flow simulator module at the end of the path according to the development plan of the previous step v) wherein the expected utility reward value is updated for the path and the first node of the explored path by the rollout process is added to the tree data structure,
until detecting convergence or timeout;

The tree structure data may be represented as a tree starting from a root node. The root node represents the starting point for any subsequent decision or observation. Decisions and observations are nodes alternatively located from the root node. The most common decision is an action, for instance to drill certain location. A further decision may be to not drill certain location.

In any case, the location or a reference to a location of the discretized domain of$_d$ is stored in the created node. The sequence starting from the first node after the root node is a sequence of decisions and observations $a_1, o_1, a_2, o_2, \ldots, a_j, o_j, \ldots$ and the history is defined as $h_t=(a_1, o_1, a_2, o_2 \ldots, a_t, o_t)$. If $(h_t, a_{t+1})$ is used, said notation indicates that the sequence defined by the history $h_t$ precedes decision ($a_{t+1}$).

Taking a decision ($a_{t+1}$) comprises determining a drilling candidate location of the node among the locations of the discretized domain $\delta\Omega_d$ not being determined in another node of the tree. That is, the drilling candidate location of the node is determined and on said candidate location an action can also be determined. In all the preferred embodiments disclosed below all drilling candidate locations are deemed to be drilled.

Observations ($o_{t+1}$) are taken at the drilling candidates locations of the previous node corresponding to the decision ($a_{t+1}$). Due to the uncertainty, a plurality of geo-statistical model realizations is used according to steps i)-iii).

When the step i) is executed after decision ($a_{t+1}$), provides the plurality of geo-statistical model realizations imposing the known data including data determined by means of the previous observations, those carried out in the sequence ($h_e$, $a_{t+1}$); that is, $o_1, o_2, o_3, \ldots o_t$.

The plurality of geo-statistical model realizations are used for determining the conditional probability function and, according to step iii) the observation is identified with the sampled value of said probability function. The sampled value is the new observation ($o_{t+1}$) at the location determined in the location of ($a_{t+1}$).

The field development plan (FDP) comprises the sequence of n actions determined by the sequence of decisions $a_1, a_2, a_3, \ldots, a_n$; for instance providing the ordered sequence of drilling well locations $l_1, l_2, l_3, \ldots, l_n$. Decisions may comprise additional variables such as the controls and schedules of each well.

The algorithm comprises two main steps, an initialization step and a tree construction step that in turn comprises steps iv)-vi).

The initialization step departures from the root node and provides an initial score with a very high value, the expected utility reward value, ensuring that all locations of the discretized domain $\delta\Omega_d$ are explored as being the first candidate location. In an embodiment, the initial score is let to infinity.

When a first location is explored a lower score is obtained; therefore, as the rest of first candidate locations have the initialized high score, they are rated in a higher position when sorted for determining the next first candidate to explore.

In the first step the tree data structure only has the root node. During the progress of the method, some paths defined by one node or by a sequence of nodes are defined. Step v) searchs along this already defined path reaching the at least last node, that is, the node farthest to the root node. From this last node, the method applies a rollout process exploring new development plans comprising the already defined steps:

taking a decision for determining a drilling candidate location, taking an observation.

That is, the step v) comprises a search and a rollout substeps.

According to an embodiment, in step v) the path is explored for a plurality of nodes located at the level of the last node, the farthest to the root node, generating a short tree having a node with the highest score. When the algorithm progresses into deeper levels, the structure of the tree shows a repeated pattern with short trees departing from a single node of the precedent short tree. That is, only an optimal candidate at each level determines the first nodes of subsequent paths reducing the huge computational cost of exploring all possible paths.

Once the end of the path has been reached a sequence of decisions and observations has been determined. The actions define a candidate field development plan (FDP) and the observations determine the reservoir realization, the second module is able to simulate the development plan by running the second reservoir flow simulator module over the reservoir realization.

The resources produced by the second module is used for rating the explored path in terms of resources produced by the reservoir by the field development plan (FDP) according to the sequence of actions defined by said explored path.

The optimal path provides a development of facilities and production strategy resulting in the most efficient production. This efficiency may also be valued by means of economical assessments such by calculating the resources or the utility of the plan calculating the net present value (NPV) which would also allow determining an efficient plan.

If the utility reward value of the explored path is updated for the path and, if said new utility reward value is greater than the maximum expected utility reward value then the first node of the explored path, that is, the next node to the farthest node of the tree, is added to the tree data structure.

The search and exploration by means of the rollout process, steps v)-vi), are carried out until convergence or until a timeout criterion is reached as this process allows to keep searching during a pre-specified period of time and stop at convenience, providing the best plan obtained after computing said pre-specified period of time.

Finally, the method carries out a last step:

e) providing the field development plan (FDP) corresponding to the nodes of the history of the path having the greater expected utility reward.

If the tree is obtained with a path having all the well locations determined, the field development plan (FDP) is defined by the sequence of nodes of the path. If the method has been stopped before completing the tree, the latest explored path with the highest score is the one defining the sequence of the plan.

According to an embodiment of the invention, a predetermined number of facies are the properties explored when observing drilled locations.

According to an embodiment of the invention, structural or hydraulic flow units are additional properties explored when observing drilled locations.

According to an embodiment of the invention, the utility reward value is the production of the reservoir after the exploitation according to the field development plan (FDP).

According to an embodiment of the invention, the utility reward value is the net present value (NPV) according to the field development plan (FDP).

According to an embodiment of the invention, each node of the tree keeps track of N(h), the total number of times that a partial history h has been visited.

According to an embodiment of the invention, the utility reward value is increased by $$c\sqrt{\frac{\log N(h_t)}{N(h_t, a)}}$$

wherein c>0 is a predetermined constant representing an exploration/exploitation trade-off value, $N(h_t)$ and $N(h_t, a)$ are the number of drilled wells for the $(h_t)$ and $(h_t, a)$ history respectively.

According to an embodiment of the invention, the decision is to drill the location of the node.

According to an embodiment of the invention, taking a decision $(a_{t+1})$ comprises determining a drilling candidate location of the node randomly among the locations of the discretized domain $\delta\Omega_d$ not being determined in another node of the tree.

According to another aspect of the invention, the method is implemented in a computer program product adapted to be executed in a computer system.

The load predictor and load distribution unit proactively shifts loads to maintain workload balanced throughout the simulation.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
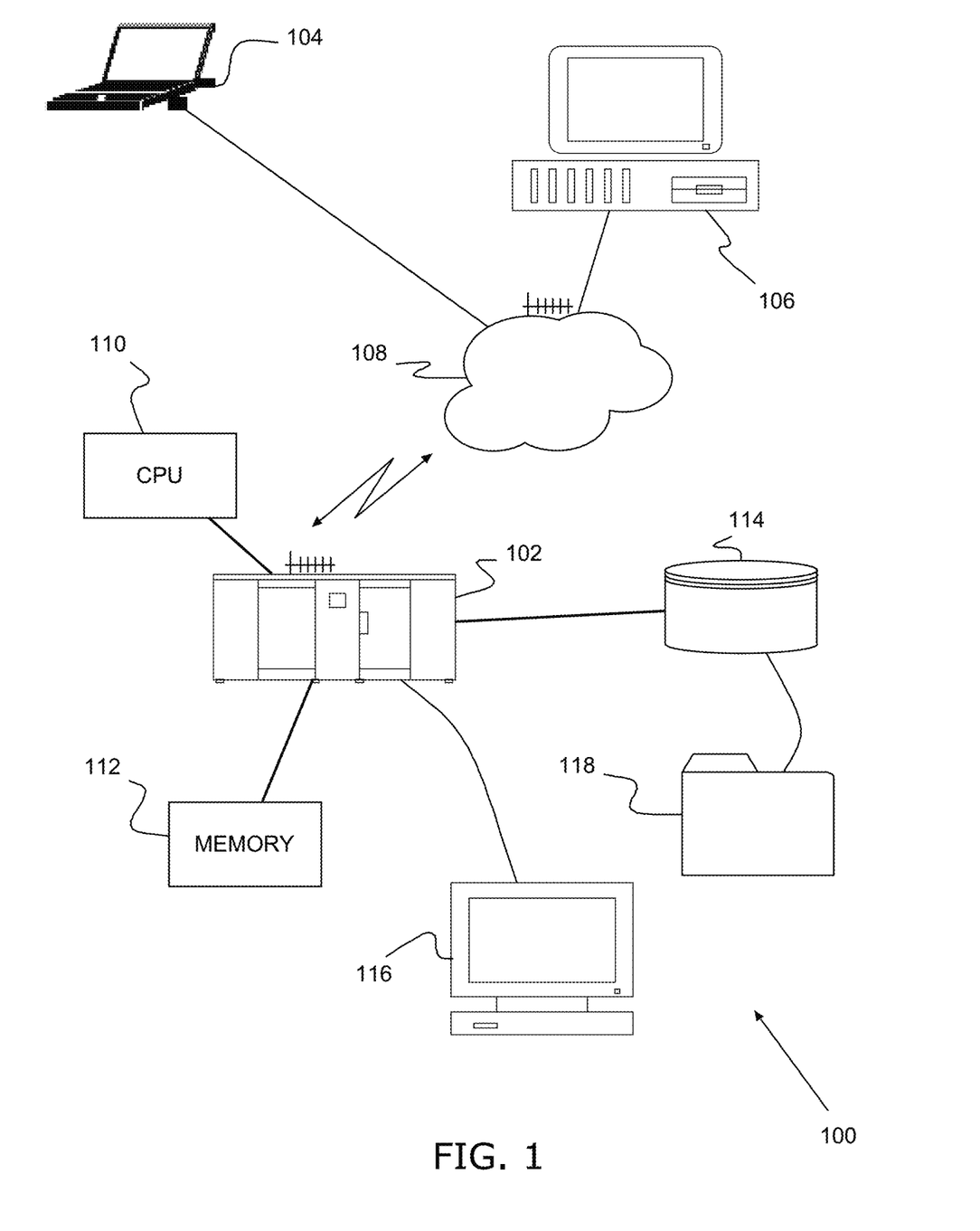
FIG. 1 shows an example of a data processing system according to an embodiment of the present invention.

Turning now to the drawings and more particularly, FIG. 1 shows an example of a system 100 for determining a field development plan (FDP) departing from field data, analog data or both, according to a preferred embodiment of the present invention.

The preferred system 100 determines a field development plan (FDP) in an efficient manner simulating in a specific manner proposed development plans comprising the sequential process of drilling and taking an observation of the reservoir at the location of the drill. Said observation is carried out by means of a module configured to generate geo-statistical models from field data, analog data or both, in particular from data determined in previous observations.

A preferred computing system 100 includes one or more computers 102, 104, 106 (3 in this example), coupled together, e.g., wired or wirelessly over a network 108. The network 108 may be, for example, a local area network (LAN), the Internet, an intranet or a combination thereof. Typically, the computers 102, 104, 106 include one or more processors, e.g., central processing unit (CPU) 110, memory 112, local storage 114 and some form of input/output device 116 providing a user interface. The local storage 114 may generate and/or include the time table or time tables stored as look-up tables being accessible by the plurality of computers 102, 104, 106, processing in parallel a plurality of migrated data in order carry out in a later stage a post-stack process over the de-migrated data provided by each computer 102, 104, 106.

According to an embodiment, a field development optimization problem is proposed wherein the location and drilling schedule of n=4 wells will be decided so that the production extracted from the reservoir is maximized. According to other embodiments, the economic value or the net present value is used as the criterion for the optimization process wherein the resources invested in the exploitation are taken into account.

Access to only one drilling rig will be assumed and therefore wells are drilled sequentially. Once a well is completed, information about the type of rock (facies) at the well location is revealed and become available before drilling the next well. The time taken to drill and analyze the core samples and well logs needed to uncover facies is assumed to be three months. Thus, the first well is drilled at time t=0, and the next wells are drilled in intervals of three months. In this setting, we must optimize the well locations as well as the order in which wells are drilled. The drilling order implicitly determines the new information that is observed at each decision step, used to improve the knowledge of the reservoir before the next well decision. Facies are observed at the location of a well right after it is drilled, and used to update of the geo-statistical model. A policy indicates where to drill the first well, as well as all the next ones conditional on the facies observed from all the previously drilled sites.

Figure 2:
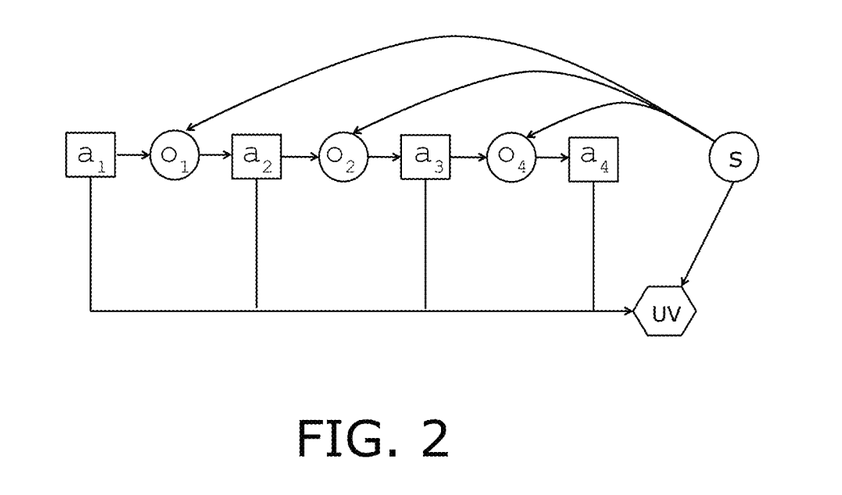
FIG. 2 shows schematically an example of an influence diagram for the sequential FDP decision problem.
Figure 3:
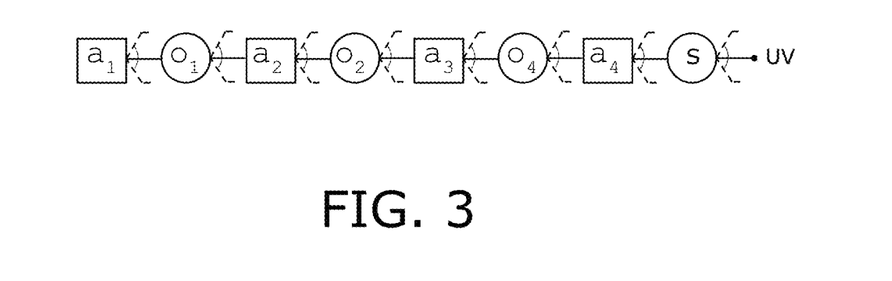
FIG. 3 shows schematically an example of a decision tree of the sequential FDP decision problem.

FIGS. 2 and 3 show the sequential FDP decision problem represented both as an influence diagram (FIG. 2A) and as decision tree (FIG. 2B). The value node, in this example a utility value UV (a, s), is shown as an hexagon in the influence diagram, represents resource valuation of a production strategy consistent of a sequence of wells drilled at locations $a=(a_1, a_2, a_3, a_4)$ for a realization S=s of the reservoir's petrophysical properties. This evaluation typically requires running a computationally expensive reservoir flow simulator to obtain simulated production rates that are converted to a utility value (UV). The company's risk attitude is therefore modeled by a utility function. Thus, the company is supposed to prefer an A=a with higher expected utility and therefore the objective is to maximize expected utility.

A history $h_t=(a_1, o_1, \ldots, a_i, o_i, \ldots, a_n, o_n)$ is a sequence of n well location decisions $A_i=a_i$ and property observations, in this embodiment the properties are facies, $O_i=o_i$ from wells i=1, n. Decisions at node $A_{t+1}$ are taken knowing history $h_t$. The chance node S represents the state of the reservoir's petrophysical properties and its probability distribution P(S) is given by the geo-statistical model. Next observation probabilities $P(O_{t+1}|h_t, a_{t+1})$ correspond to the probability marginals at location $a_{t+1}$ of the updated geo-statistical model $P(S|h_t)$. Updating the geostatistical model requires reversing the arcs from chance node S to nodes $O_1, \ldots, O_t, \ldots, O_t$ using Bayes rule.

In theory, an optimal FDP can be found applying the standard decision analytic approach based on dynamic programming wherein, for example the optimization problem to solve for n=4 is $$\max_{a_1} \sum_{o_1} \max_{a_2} \sum_{o_2} \max_{a_3} \sum_{o_3} \left[ \max_{a_3} \sum_{o_3} UV(a,s) P(s|h_3) \right]$$

$$P(o_3|h_2, a_3) P(o_2|h_1, a_2) P(o_1|a_1)$$

and by applying backward induction $a_1^*, a_2^*(a_1^*, o_r), a_3^*(a_1^*, o_1, a_2^*, o_2)$ and $a_4^*(a_1^*, o_1, a_2^*, o_2, a_3^*, o_3)$ constitutes an optimal well location policy for the FDP. It specifies the best location for the first well, and every consecutive well as a function of any future observations from previously drilled optimal wells.

However, when measuring the computational complexity of this procedure for a 2-dimensional grid of 20×20 and n=4 wells, there are approximately $2 \times 10^{11}$ combinations of histories that have to be evaluated against the set of possible reservoir realizations. If each evaluation takes approximately 2 secs, for such a small case this would already require over 12 million years to compute which is not affordable.

According to an embodiment of the invention, the world environment under consideration is the reservoir and its set of states of all the possible reservoir's realizations of petrophysical properties. n decision epochs at periods t=1, ..., n are defined. The set of possible decision, for instance an action, $A_t$ to choose from at each decision epoch t corresponds with all the possible locations in the reservoir grid at which a well can be drilled. Since wells cannot be drilled very close to each other, a location constraint will be considered defining $A_t(h_{t-1})$ as a function of all previously chosen wells $(a_1, \ldots, a_{t-1})$ specified by history $(h_{t-1})$. It is assumed that at every decision epoch t the decision is to drill a well, that is, there is not the option of not to drill. The set of possible observations at epoch t corresponds with all the possible petrophysical properties that can be revealed at location $a_1$ after drilling.

The decisions, in this case the action of drilling, cannot affect the state of the reservoir's petrophysical properties. Thus, the conditional transition probabilities would be $P(S_{t+1}=s'|S_t=s, A_t=a)=1$ if $s \propto =s$, and zero otherwise. The reservoir's properties are given by the initial state probabilities $P(S_0=s)$, which corresponds with the spatial geo-statistical model of the reservoir given by P(S). The state of the reservoir is not fully observable. However, partial observations of this state are available at every epoch in the location where the well is drilled. The conditional observation probabilities are given by $P(O_t|S_t=s, A_t=a_t)$, the probability marginals of the geo-statistical model at the location $A_t=a_t$. The state S=s of the reservoir and the observations $O_t=o_t$ can be simulated from the probabilities of the geo-statistical model. Observations from drilled wells update our beliefs over the state of the reservoir's petrophysical properties. Given the observations in history $h_t$, the beliefs are updated over the state of the reservoir $P(S_t=s|h_t)$. In our case, the probability distribution is directly sampled without the need of Bayes rule.

The return corresponds with the utility value indicating the performance of the reservoir. The return UV(a, s) is then calculated after all decisions have been made and is a function of the actions $a=(a_1, \ldots, a_n)$ from a complete history and the realization $S_n=s$ of the final state of the reservoir. This allows for the comparison of different development strategies over the productive life of the reservoir.

Figure 4A:
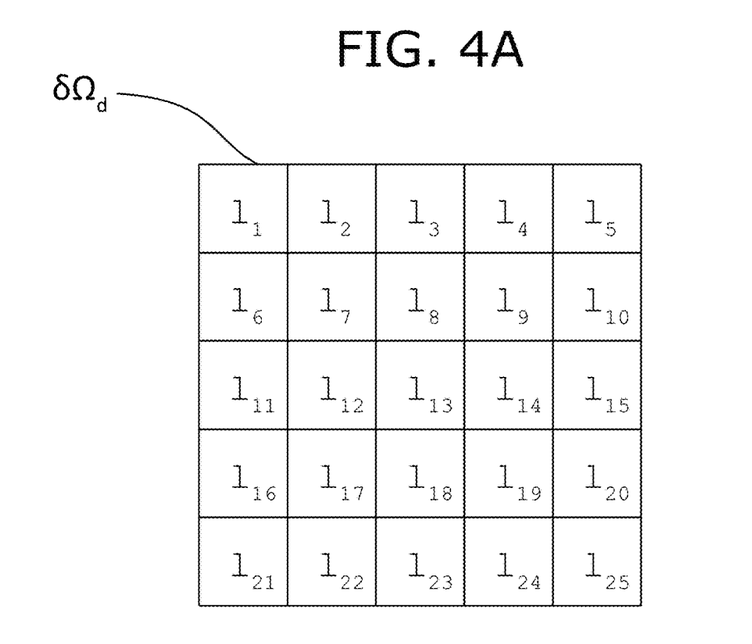
FIG. 4A shows an example of a rectangular grid according to the discretization of the domain of an embodiment whit a finite number of candidate locations.

FIG. 4A shows a rectangular discretized domain $\delta\Omega_d$ comprising a regular grid with a finite number of locations determined by the center of the rectangles. The discretized domain $\delta\Omega_d$, in this embodiment, represents the surface where wells can be located according to the field development plan (FDP). Once the field development plan (FDP) is determined, the exploitation of the reservoir comprises to provide the facilities for drilling the locations and for assisting the production of the wells with the equipment wherein said exploitation is carried out according to the sequence of drilling and the schedule for the control of the wells defined by said field development plan (FDP). This is a new example where n=7.

According to an embodiment, a first module, for instance implemented in a computer system, is configured to generate a geo-statistical model realization of the reservoir using the available data. The available data may be obtained by samples of rock, by analogous data bases, seismic data, or a combination of any of such data sources.

During the computation of the field development plan (FDP), a plurality of geo-statistical models realizations needs to be generated. In particular, when an observation provides information regarding one or more locations, the first module provides a geo-statistical model realization of the reservoir according to the available data and the data provided by the observation.

Once a specific field development plant (FDP) is determined, a second module configured to simulate a geo-statistical model realization simulates the flow conditions on the geo-statistical realization determined with all the observations and provides the production retrieved under such conditions.

Figure 4B:
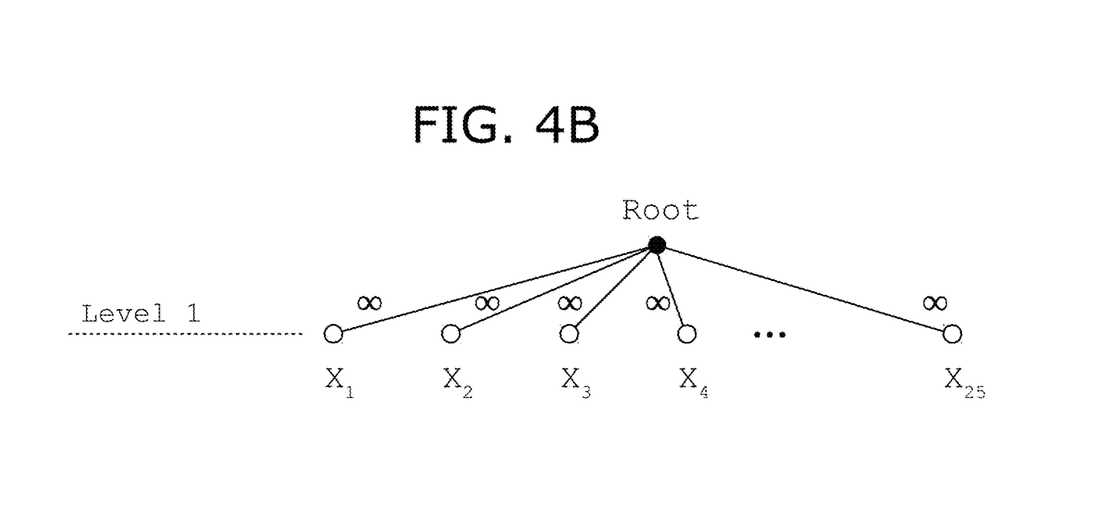
FIG. 4B shows a schematic example of the starting process from a root node for generating a tree structure.

FIG. 4B shows the starting process for generating a tree structure data starting from a root node. The nodes of the tree are structured by levels, alternating levels comprising nodes representing a decision ($a_t$), and levels comprising nodes representing an observation ($o_t$) wherein the sequence of decisions and observations from the root node to a certain node $X_t$ is identified by the history as $h_t=(a_1, o_1, a_2, o_2, \ldots, a_t, o_t, a_n, o_n)$ and the first node corresponds to a decision ($a_1$). In this embodiment the decision is the location where the well will be drilled.

According to this graphical representation, even levels represent decisions and pair levels represent observations. Nonetheless, other graphical representation can be used that may be equivalent to the graphical representation used in FIG. 4B.

The root node represents the beginning of the algorithm showing that the first well may be located at any of the locations $l_i$, $i=1, \ldots, 25$. As the paths departing from the root are not still generated, given that none decision has been taken, the nodes are shown in white.

The initialization process let the utility reward value related to any of the possible decisions to a very high value, preferably to infinite. This high value obligates to the algorithm to explore each location of the discretized domain $\delta\Omega_d$ at least once.

At any stage, the first path showing a utility reward value with the highest score is explored following each path of the tree until the end. That is, the path determined by the first node is visited until the final node, a decision node or an observation node. Departing from this node, a rollout process is applied completing the field development plan (FDP).

Figure 5A:
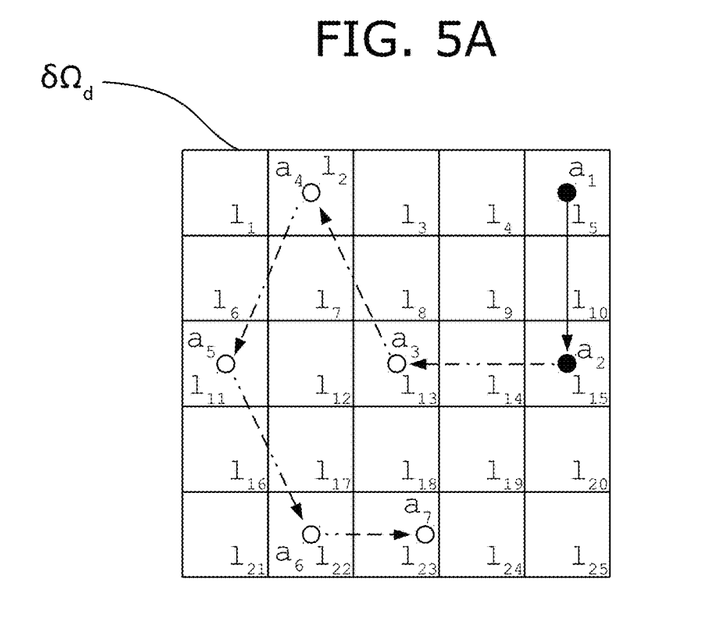
FIG. 5A shows the grid of FIG. 4A with the decision taking to locate a well after an observation.
Figure 5B:
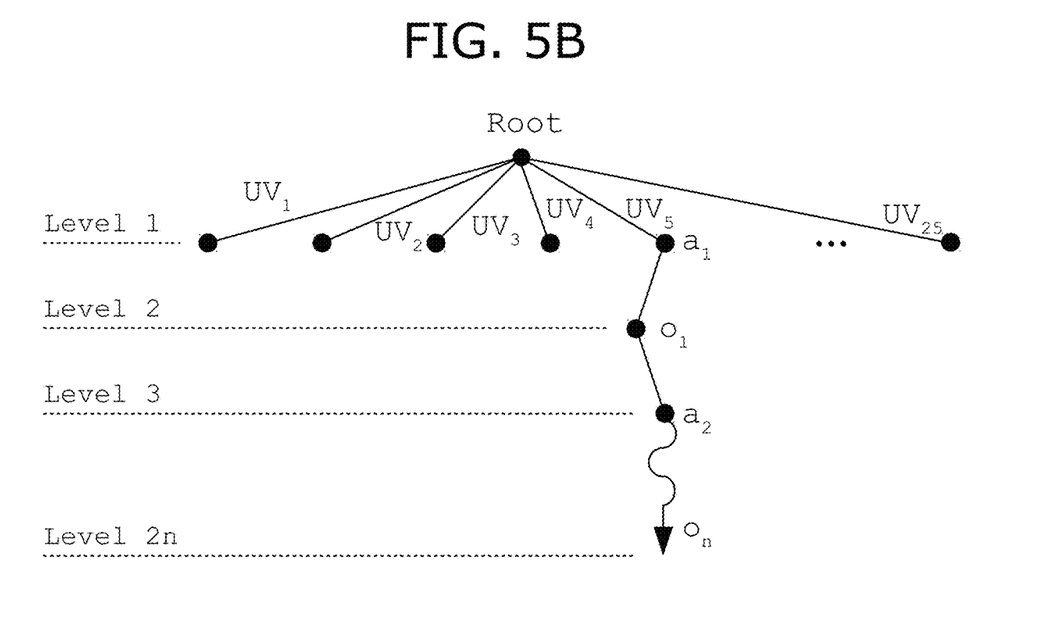
FIG. 5B shows an example of the tree structure data of FIG. 4B with an utility reward value (UV) for each path and the explored intersecting nodes as decision or observation in a more evolved stage.

FIG. 5B shows a tree structure data wherein all locations of the discretized domain $\delta\Omega_d$ has been visited and then each departing path of the tree has an utility reward value (UV) giving priority to those paths with higher score. FIG. 5B depicts a first node for any possible path shown in black as all nodes have been added to the tree and the score ($UV_1, \ldots, UV_{25}$) evaluated.

Paths departing from the location $l_5$ and $l_6$ has additional nodes created during the progress of the algorithm. Departing from this tree, if the utility reward value of path starting from location $l_5$ is the highest, nodes according to decision $a_1$, observation $o_1$ and decision $a_2$ are already created in the tree data structure.

FIG. 5A shows that decision $a_1$ is the action corresponding to locate the well at location $l_5$, and once said location has been observed ($o_1$), the second well has been located at location $l_{15}$ according to decision $a_2$.

The next step is carrying out an observation of the location corresponding to the second decision $a_2$, at location $l_{15}$.

The observation requires generating a plurality of geo-statistical models by means of the first module with the available data plus the data provided by the first observation $o_1$ at location $l_5$.

The plurality of geo-statistical model realizations allows the computation of the conditional probability of each property, among a finite number of predetermined properties. Once the conditional probability has been computed the observation is determined by sampling the conditional probability distribution. The sampled value is the observed property or properties at the location corresponding to the current node.

According to this embodiment, the facies is the property sampled and observed.

In this embodiment, the next location is determined randomly according to a uniform probability distribution. The uniform probability distribution is defined over the locations not being still drilled (with a well), once the additional constraints have been applied. For instance, a first constraint discards the locations that are closer to the locations with a well than a predetermined distance. Other constraints may discard other locations responsive to additional available reservoir information.

Other embodiments may modify the probability distribution weighting locations also responsive to additional available reservoir information.

The well location and the subsequent observation progresses until the maximum number of wells has been located, there are no more available locations or a combination of stopping criteria is reached.

Once the rolling out process has finished, the sequence of nodes corresponding to decisions of drilling at a certain location, the actions $a=(a_1, \ldots, a_n)$, the second module simulates the reservoir according to the geo-statistical model realization determined at the end of the rollout process and the actions that defines an specific field development plan (FDP).

According to a preferred embodiment, step v) further comprises a plurality of rollout processes in parallel speeding up the algorithm wherein in step vi) the plurality of paths are evaluated selecting the path with the highest utility reward value.

The utility reward value responsive to the simulation allows scoring the explored path. If the score is higher than the previous one, the score of said path is updated; therefore, the node identified with a black square is added to the tree data structure.

This process can be running until a convergence criterion such a maximum timeout value is reached or if convergence of the utility reward value is identified.

In the field development plan (FDP) shown in FIG. 5A, the maximum number of located wells following the criteria described above are n=7.

The path showing the highest utility reward value (UV) defines the actions $a=(a_1, \ldots, a_n)$ defining the field development plan (FDP) deemed as being optimal.

Whether the search and exploration are carried out until a convergence as if timeout criterion is reached, the best field development plan is determined by the path with the optimal utility reward value (UV).

The observations and the geo-statistical model realizations are also the best estimation of reservoir.

Figure 6:
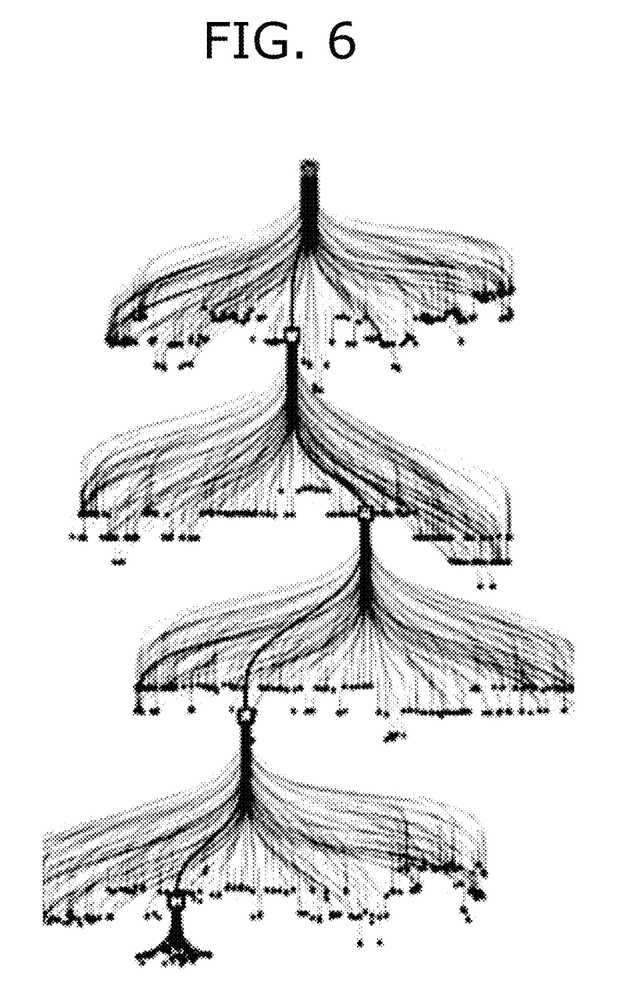
FIG. 6 shows an example of the tree structure data obtained after running an embodiment of the invention wherein a plurality of nodes are explored at each level.

FIG. 6 shows the tree structure data obtained after running an embodiment wherein a plurality of nodes are explored at each level.

After exploring the nodes of a determined level a short tree is drawn and a node depicted with a thicker dot is identified as the node having the highest score. The next level is also explored depicting a new short tree connected through the node with the highest score providing the preferred path connecting the short trees. The path connecting at each level the nodes with highest score is the optimal path by defining the resulting field development plan (FDP).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a field development plan (FDP) for exploitation of oil and gas reservoirs, said method comprising:
    a) determining a discretized domain $\delta\Omega_d$ comprising a grid of a finite number of locations of a reservoir as candidate locations for drilling a well;
    b) generating geo-statistical model realizations of the reservoir according to:
        facies and/or petrophysical properties obtained from green field data, analogous data or both and,
        a predetermined number p of facies and/or petrophysical properties (PRi), i=1 . . . p specified at said candidate locations of the discretized domain $\delta\Omega_d$;
    c) simulating the geo-statistical model realizations according to the field development plan (FDP) and configured to return an utility reward value;
    d) determining a tree structure data, starting from a root node, wherein nodes of the tree are structured by levels of said nodes, alternating ones of the levels comprising ones of the nodes each representing a decision ($a_t$) and others of the levels comprising others of the nodes representing an observation ($o_t$) wherein a sequence of decisions and observations from the root node to a certain node $X_t$ is identified by a history ($h_t$), where $h_t = (a_1, o_1, a_2, o_2 \ldots, a_t, o_t)$ and wherein:
        taking a next decision ($a_{t+1}$) comprises determining a drilling candidate location of a decision node among said candidate locations of the discretized domain $\delta\Omega_d$ not being determined in another decision node of the tree; taking a next observation ($o_{t+1}$), being at the drilling candidate location of a previous decision node, comprises:
            i. generating a plurality of geo-statistical model realizations according to the ($PR_i$), i=1 . . . p facies and/or petrophysical properties determined by the previous observations of the history,
            ii. determining a conditional probability $P(PR_i|h_t)$, i=1 . . . p from the plurality of geo-statistical model realizations generated in the previous step i),
            iii. providing an stochastically sampled property according to the conditional probability $P(PR_i|h_t)$, as being a result of the observation ($o_{t+1}$)
        and wherein the determination of the nodes of said tree structure data comprises the following steps:
            departing from the root node, initializing as an expected utility reward value for each decision node of a first level a predetermined maximum value,
            iv. sort paths of the tree structure data departing from the root according to the expected utility reward value,
            v. a path with maximum expected utility reward value is explored from a last node, farthest from the root node, by a rollout process, said rollout process comprising the steps:
                taking the decision for determining the drilling candidate location,
                taking an observation,
                until a complete said field development plan (FDP) is reached,
            vi. evaluate a new expected utility reward value for the explored said path by simulating the plurality of geo-statistical model realizations generated at the end of the explored path according to the field development plan (FDP) of the previous step v) wherein the expected utility reward value is updated for the explored path and the first node of the explored path by the rollout process is added to the tree data structure, until detecting convergence or timeout; and
    e) providing the field development plan (FDP) corresponding to one or more nodes of the history of the path having greater expected utility reward, the field development plan (FDP) being provided for exploitation of the reservoir.

2. A method according to claim 1, wherein in step v) the path is explored for a plurality of nodes located at the level of the last node, farthest from the root node.

3. A method according to claim 2, wherein all nodes located at the level of the last node are explored.

4. A method according to claim 1, wherein step v) further comprises a plurality of rollout processes in parallel and wherein in step vi) a plurality of paths are evaluated selecting one path with the highest expected utility reward value.

5. A method according to claim 1, wherein the utility reward value is production of the reservoir after exploitation according to the field development plan (FDP).

6. A method according to claim 1, wherein the reservoir net present value (NPV) is the expected utility reward value.

7. A method according to claim 1, wherein each node of the tree keeps track of N(h), the total number of times a partial history has been visited.

8. A method according to claim 1, wherein the utility reward value is increased by $$c\sqrt{\frac{\log N(h_t)}{N(h_t, a)}}$$

wherein c>0 y a predetermined constant representing an exploration/exploitation trade-off value, $N(h_t)$ and $N(h_t, a)$ are the number of drilled wells for the $h_t$ and $h_t$, a history respectively.

9. A method according to claim 1, wherein generating said geo-statistical model realizations of the reservoir further depending on the tree structure data of the reservoir.

10. A method according to claim 1, wherein the decision is to drill corresponding locations of each of the one or more nodes.

11. A method according to claim 1, wherein taking said next decision ($a_{t+1}$) comprises determining the drilling candidate location of said next node randomly among the locations of the discretized domain $\delta\Omega_d$ not being determined in another node of the tree.

12. A method according to claim 1, wherein the predetermined maximum value taken in the initialization step is infinite.

13. A method according to claim 1, wherein the complete field development plan (FDP) is reached in step v) when any of the following conditions are reached:
- a predetermined number of nodes in decision levels,
- a predetermined computational time,
- a convergence criterion for the utility reward value.

14. A method according to claim 1, wherein taking said next decision ($a_{t+1}$) comprises determining the drilling candidate location of said next node among the locations of the discretized domain $\delta\Omega_d$ not being determined in another node of the tree and additional constraints.

15. A method according to claim 14, wherein the additional constraints is a minimum distance to locations of the decision nodes of the history.

16. A computer program product for generating a field development plan (FDP) for exploitation of oil and gas reservoirs, said computer program product comprising a computer usable medium having computer readable program code stored thereon, said computer readable program code causing computers executing said code to:
 a) determining a discretized domain $\delta\Omega_d$ comprising a grid of a finite number of locations of a reservoir as candidate locations for drilling a well;
 b) generating geo-statistical model realizations of the reservoir according to:
  facies and/or petrophysical properties obtained from green field data, analogous data or both and, a predetermined number p of facies and/or petrophysical properties (PRi), i=1 . . . p specified at said candidate locations of the discretized domain $\delta\Omega_d$;
 c) simulating the geo-statistical model realizations according to the field development plan (FDP) and configured to return an utility reward value;
 d) determining a tree structure data, starting from a root node, wherein nodes of the tree are structured by levels of said nodes, alternating ones of the levels comprising ones of the nodes representing a decision ($a_t$) and others of the levels comprising others of the nodes representing an observation ($o_t$) wherein a sequence of decisions and observations from the root node to a certain node $X_t$ is identified by a history ($h_t$), where $h_t=(a_1, o_1, a_2, o_2 \ldots, a_t, o_t)$ and wherein:
  taking a next decision ($a_{t+1}$) comprises determining a drilling candidate location of a decision node among said candidate locations of the discretized domain $\delta\Omega_d$ not being determined in another decision node of the tree; taking a next observation ($o_{t+1}$), being at the drilling candidate location of a previous decision node, comprises:
   i. generating a plurality of geo-statistical model realizations by means of the first modulo according to the (PR), i=1 . . . p facies and/or petrophysical properties determined by the previous observations of the history,
   ii. determining a conditional probability $P(PR_i|h_t)$, i=1 . . . p from the plurality of geo-statistical model realizations generated in the previous step i),
   iii. providing an stochastically sampled property according to the conditional probability $P(PR_i|h_t)$, as being a result of the observation ($o_{t+1}$)
 and wherein the determination of the nodes of said tree structure data comprises the following steps:
  departing from the root node, initializing as an expected utility reward value for each decision node of a first level a predetermined maximum value,
  iv. sort paths of the tree structure data departing from the root according to the expected utility reward value,
  v. a path with maximum expected utility reward value is explored from a last node, farthest from the root node, by a rollout process, said rollout process comprising the steps:
   taking the decision for determining the drilling candidate location,
   taking an observation,
   until a complete said field development plan (FDP) is reached,
  vi. evaluate a new expected utility reward value for the explored said path by simulating the plurality of geo-statistical model realizations generated at the end of the explored path according to the field development plan (FDP) completed in the previous step v) wherein the expected utility reward value is updated for the explored path and the first node of the explored path by the rollout process is added to the tree data structure, until detecting convergence or timeout; and
 e) providing the field development plan (FDP) corresponding to one or more nodes of the history of the path having greater expected utility reward, the field development plan (FDP) being provided for exploitation of the reservoir.

17. A system for exploiting oil and gas reservoirs, said system comprising:
a processor set; and
a computer readable storage medium having program instructions stored therein;
wherein: the processor set executes the program instructions causing the processor set to perform a method including:
determining a discretized domain $\delta\Omega_d$ comprising a grid of a finite number of locations of a reservoir as candidate locations for drilling a well;
generating geo-statistical model realizations of the reservoir according to:
 facies and/or petrophysical properties obtained from green field data, analogous data or both and,
 a predetermined number p of facies and/or petrophysical properties (PRi), i=1 . . . p specified at said candidate locations of the discretized domain $\delta\Omega_d$;
simulating geo-statistical model realizations according to a field development plan (FDP) and configured to return an utility reward value;
determining a tree structure data, starting from a root node, wherein nodes of the tree are structured by levels of said nodes, alternating ones of the levels comprising ones of the nodes representing a decision ($a_t$) and others of the levels comprising others of the nodes representing an observation ($o_t$) wherein a sequence of decisions and observations from the root node to a certain node $X_t$ is identified by a history ($h_t$), where $h_t=(a_1, o_1, a_2, o_2 \ldots, a_t, o_t)$ and wherein:
 taking a next decision ($a_{t+1}$) comprises determining a drilling candidate location of a decision node among said candidate locations of the discretized domain $\delta\Omega_d$ not being determined in another decision node of the tree;

taking a next observation ($o_{t+1}$), being at the drilling candidate location of the previous decision node, comprises:

generating a plurality of geo-statistical model realizations according to the ($PR_i$), i=1 ... p facies and/or petrophysical properties determined by the previous observations of the history, determining a conditional probability $P(PR_i|h_t)$, i=1 ... p from the generated plurality of geo-statistical model realizations, providing an stochastically sampled property according to the conditional probability $P(PR_i|h_t)$, as being a result of the observation ($o_{t+1}$)

and wherein the determination of the nodes of said tree structure data are determined by:

departing from the root node, initializing as an expected utility reward value for each decision node of a first level a predetermined maximum value, sort paths of the tree structure data departing from the root according to the expected utility reward value, a path with maximum expected utility reward value is explored from a last node, farthest from the root node, by a rollout process, said rollout process comprising:

taking the decision for determining the drilling candidate location, taking an observation, until a complete said field development plan (FDP) is reached, evaluate a new expected utility reward value for the explored said path by simulating the plurality of geo-statistical model realizations generated at the end of the explored path according to the completed field development plan (FDP), wherein the expected utility reward value is updated for the explored path and the first node of the explored path by the rollout process is added to the tree data structure, until detecting convergence or timeout; and providing the field development plan (FDP) corresponding to the one or more nodes of the history of the path having greater expected utility reward, the field development plan (FDP) being provided for exploitation of the reservoir.

* * * * *